United States Patent
Ohno

[11] 3,803,912
[45] Apr. 16, 1974

[54] FLOW QUANTITY MEASURING SYSTEM
[75] Inventor: Masaaki Ohno, Tokyo, Japan
[73] Assignee: Tokico Ltd., Kawasaki-City, Kanagawa-ken, Japan
[22] Filed: Sept. 28, 1972
[21] Appl. No.: 293,043

[30] Foreign Application Priority Data
Sept. 28, 1971 Japan.............................. 46-75673

[52] U.S. Cl..................................... 73/195, 73/197
[51] Int. Cl............................................... G01f 7/00
[58] Field of Search ............ 73/195, 196, 197, 202, 73/203; 235/141.35

[56] References Cited
UNITED STATES PATENTS
| | | | |
|---|---|---|---|
| 3,559,480 | 2/1971 | Barber et al. | 73/197 |
| 2,821,085 | 1/1958 | Gehre | 73/197 |
| 2,085,224 | 6/1937 | Kruger | 73/195 |

*Primary Examiner*—Richard C. Queisser
*Assistant Examiner*—Arthur E. Korkosz

[57] ABSTRACT

A flow quantity measuring system comprises: a small-flowrate branch pipeline not provided with a shut-off valve; a large-flowrate branch pipeline provided with a shut-off valve; a small-flowrate flowmeter provided in the small-flowrate branch pipeline and having an upper flowrate limit value within which measurement can be carried out with a specific precision; a large flowrate flowmeter provided in the large-flowrate branch pipeline and having a lower flowrate limit value within which measurement can be carried out with a specific precision; changeover switching means for selectively switching and supplying the results of measurement of the flowmeters to a counter section for counting these results; and control means for controlling the changeover switching means and the opening and closing of the shut-off valve. The control means operates to switch the changeover switching means thereby to cause, when the flowrate of a liquid flowing through a liquid conduit pipeline increases and exceeds the above mentioned upper flowrate limit value, the shut-off valve to open, and, at the same time, the result of measurement of the large-flowrate flowmeter to be supplied to the counter section and to cause, when the flowrate decreases and becomes less than the above mentioned lower flowrate limit value, the shut-off valve to close and the result of measurement of the small-flowrate flowmeter to be supplied to the counter section after a predetermined time from this closure of the shut-off valve.

8 Claims, 4 Drawing Figures

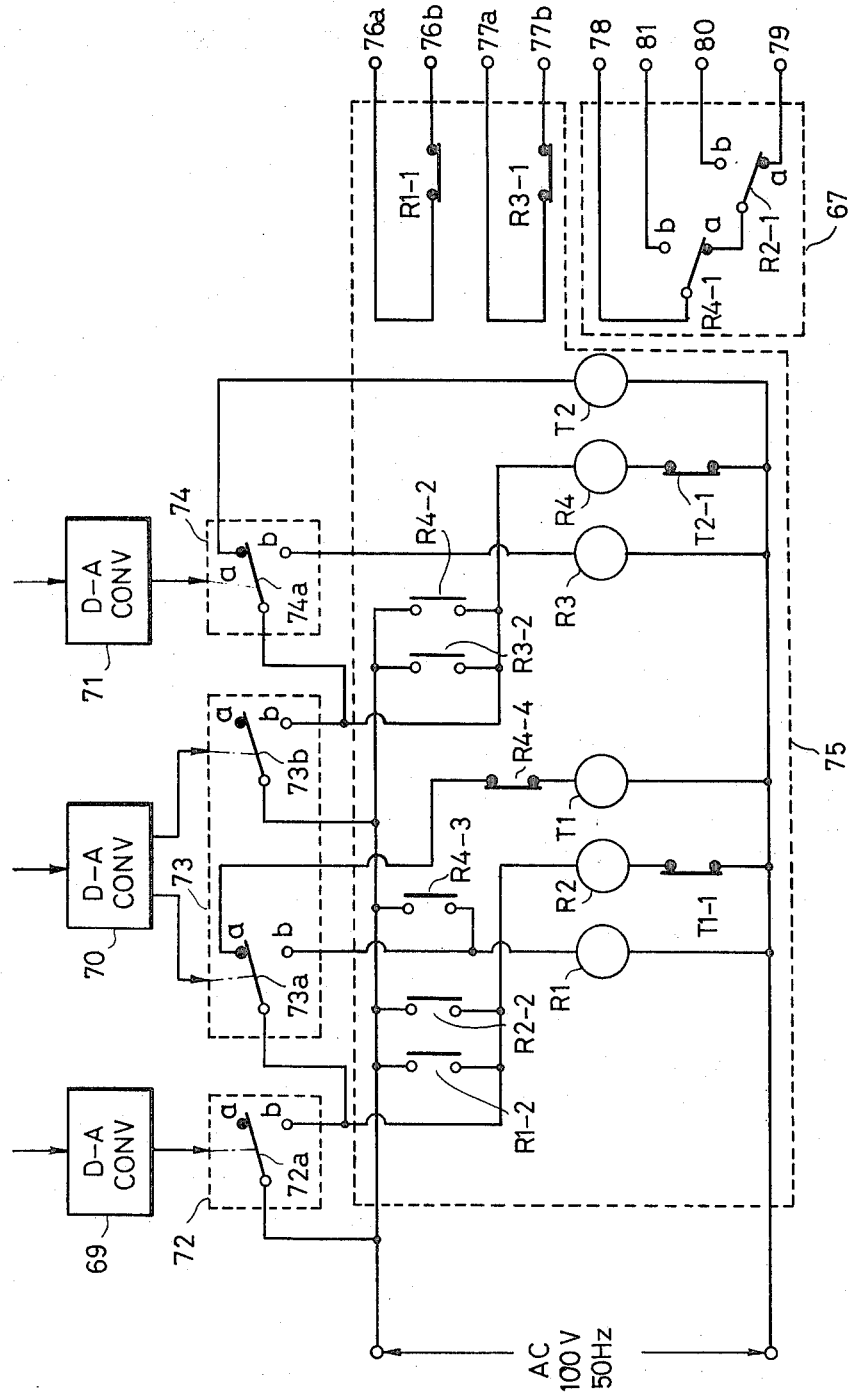

FLOW QUANTITY MEASURING SYSTEM

BACKGROUND OF THE INVENTION

The present invention relates generally to fluid flow quantity measuring systems and more particularly to a system capable of accomplishing accurate and reliable flow quantity measurements with a specific constant degree of precision with respect to any flowrate over a wide range of from low to high flowrates through the interchanged use of a plurality of flowmeters.

In general, there is a flow quantity range with definite limits, in any one flowmeter, within which accurate and reliable flow quantity measurements can be carried out with a specific constant degree of precision, and accurate and reliable flow quantity measurements cannot be accomplished with respect to high or low flow quantity which exceed these limits.

Accordingly, in order to carry out accurate and reliable measurements of flow quantities over a wide range, a system for carrying out flow quantity measurements through the use of a plurality, for example, two, of flowmeters provided in parallel arrangement has been proposed. In this known system, there are provided a branch pipeline for high flowrate and a branch pipeline for low flowrate, which pipelines respectively conduct the flows of fluids in accordance with their respective flowrates. The branch pipeline for high flowrate is provided therewithin with a shut-off valve and a flowmeter for high flowrate, while the branch pipeline for low flowrate is provided therewithin with a shut-off valve and a flowmeter for low flowrate.

In this known system, for high flowrate, the shut-off valve of the branch pipeline for high flowrate is opened, and flow quantity measurement is carried out with the flowmeter for high flowrate. For low flowrate, the shut-off valve for high flowrate is shut off, the shut-off valve of the branch pipeline for low flowrate is opened, and flow quantity measurement is carried out with the flowmeter for low flowrate.

Since a shut-off valve is provided in each of the branch pipelines in this known system, the entire system tends to become expensive. Furthermore, a large member of shut-off valves mean that the probability of impairment of the normal operation of the entire system due to valve malfunctioning is that much higher. Accordingly, this system is not suitable for use in applications, such as fire-fighting systems, wherein failures cannot be permitted. Still another difficulty arises from the fact that there is a certain time period from the start of opening to full opening or from start of closing to full closure in a shut-off valve. For this reason, when the measurement operations of the flowmeters are changed over simultaneously with the opening or closing of the valves, errors in measurement occur.

SUMMARY OF THE INVENTION

Accordingly, it is a general object of the present invention to provide a new and useful flow quantity measuring system in which the above described difficulties are overcome.

More specifically, an object of the invention is to provide a system capable of accurately measuring flow quantities over a wide flowrate range from low flowrate to high flowrate.

Another object of the invention is to provide a flow quantity measuring system requiring only a small number of shut-off valves.

Still another object of the invention is to provide a flow quantity measuring system capable of carrying out accurate measurement even during changing over of shut-off valves.

Further objects and features of the present invention will be apparent from the following detailed description set forth with reference to the accompanying drawings, throughout which like parts are designated by like reference numerals.

BRIEF DESCRIPTION OF THE DRAWINGS

In the drawings:

FIG. 4 is a circuit diagram showing one embodiment of the control circuit in the system shown in FIG. 3.

DETAILED DESCRIPTION

Figure 1:
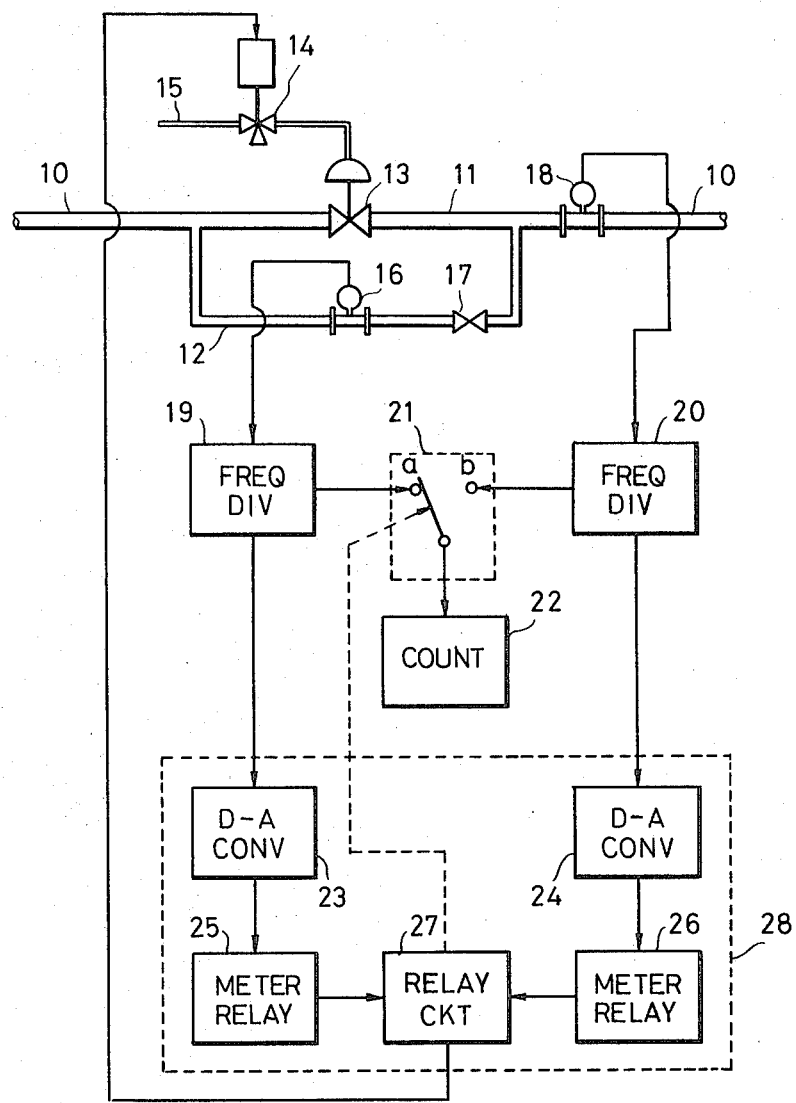
FIG. 1 is a piping diagram in combination with a block schematic diagram showing one embodiment of a flow quantity measuring system constituting a preferred embodiment of the present invention.

As indicated in FIG. 1, at a midway point in a main liquid conduit pipeline 10, a branch pipeline 11 for large flowrate and a branch pipeline 12 for small flowrate are provided as branches. The large-flowrate branch line 11 is provided therein with a shut-off control valve 13. While this shut-off valve may be of a pneumatic type or of an electromagnetic type, a pneumatic control valve is used in the instant embodiment and is supplied with pneumatic pressure through an air pipeline 15 having a three-way changeover valve 14.

The branch line 12 for small flowrate is provided therein with a flowmeter 16 for measuring small flowrate and an overflow preventing valve 17. This valve 17 is merely a valve for restricting the flow through the branch pipeline 12 to determine the maximum flowrate and for protecting the flowmeter 16 and is not a changeover valve. This valve 17 may be omitted. In addition, a flowmeter 18 for measuring large flowrate is installed in the main liquid conduit line 10 downstream from the branch lines 11 and 12.

Measured pulse signals from the flowmeters 16 and 18 are respectively supplied to frequency dividers 19 and 20 for reducing the frequencies of the signals to signal frequencies suitable for counting of the signals. The output sides of these frequency dividers 19 and 20 are respectively connected to stationary contact points $a$ and $b$ of a changeover switch 21. The movable contact member of this changeover switch 21 is connected to a counter section 22 of a device such as a counter or an indicator. This movable contact member of the changeover switch 21 is normally in contact with the side of the contact point $a$.

On one hand, the outputs of the frequency dividers 19 and 20 are respectively supplied to digital-analog converters (hereinafter referred to as D-A converters) 23 and 24 for converting pulse signals into analog signals. A meter relay 25 connected to the output side of the D-A converter 23 sends a signal to a relay circuit 27 when the output analog signal of the D-A converter 23 increases and reaches a specific value, that is, when the flowrate in the branch pipeline 12 (10) increases and reaches an upper flowrate limit value (hereinafter referred to simply as the upper flowrate limit value, which is, for instance, 55 cubic meters/h in the instant embodiment) within which the flowmeter 16 can carry out flow measurement while maintaining a specific degree of precision. A meter relay 26 connected to the output side of the D-A converter 24 sends a signal to the relay circuit 27 when the output analog signal of the D-A converter 24 decreases and reaches a specific value, that is, when the flowrate in the pipeline 10 decreases and reaches a lower flowrate value (hereinafter referred to simply as the lower flowrate limit value, which is, for instance, 50 cubic meters/h in the instant embodiment) within which the flowmeter 18 can carry out measurement while maintaining a specific degree of precision. As described above, an overlap of 5 cubic meters/h is provided between the upper flowrate limit value (55 $m^3/h$) of the flowmeter 16 and the lower flowrate limit value (50 $m^3/h$) of the flowmeter 18. The purpose of this overlap is to prevent hunting and to attain a stable measuring precision.

When the relay circuit 27 receives an upper limit signal from the meter relay 25, it immediately changes over the movable contact member of the changeover switch 21 from contact point $a$ to contact point $b$ and, furthermore, sends a signal to the three-way valve 14 for opening the shut-off control valve 13. On the other hand, when the relay circuit 27 receives a lower limit signal from the meter relay 26, it immediately sends a signal to the three-way valve 14 for closing the control valve 13. Then, after a delay of a specific time (i.e., a time interval which is slightly greater than the time required by the valve 13 to entirely close) the relay circuit sends a signal for causing the movable contact member of the switch 21 from the contact point $b$ to the contact point $a$.

While, in the instant embodiment, the D-A converters 23 and 24, the meter relays 25 and 26, and the relay-circuit 27 constitute a control circuit 28, the invention is not necessarily limited to such an organization, it being possible to use, in place of the meter relays 25 and 26 and the relay circuit 27, a device such as a comparator which transmits signals to the switch 21 and the three-way valve 14 when the output from the D-A converters 23 and 24 becomes higher or lower than a specific reference voltage.

Figure 2:
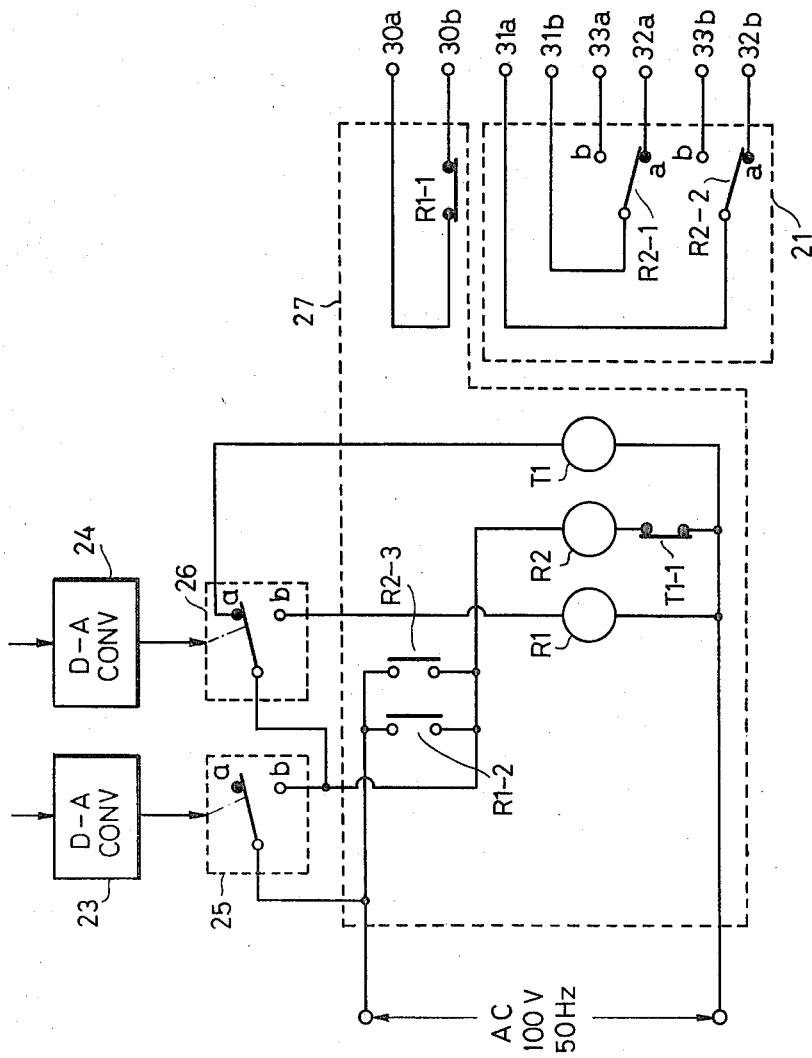
FIG. 2 is a circuit diagram showing one embodiment of the control circuit in the system illustrated in FIG. 1.

One embodiment of a circuit connection arrangement of the control circuit 28 including the above described meter relays 25 and 26 and relay circuit 27, and switch 21 is shown in FIG. 2. The movable contacts of the meter relays 25 and 26 are respectively controlled in their switching operations by the outputs of the D-A converters 23 and 24, being respectively switched and connected to their contact points $a$ when their flowrates are respectively below 55 $m^3/h$ and 50 $m^3/h$ and to their contact points $b$ when their flowrates are higher.

A normally closed relay switch R1–1 opened when a relay R1 operates is connected between terminals 30a and 30b connected to the three-way valve 14. The movable contact members of relay switches R2–1 and R2–2 which are switched from their respective fixed contact points $a, a$ to their contact points $b, b$ when a relay R2 operates are connected by way of terminals 31a and 31b to the counter section 22. The contact points $a, a$ of the relay switches R2–1 and R2–2 are respectively connected by way of terminals 32a and 32b to the frequency divider 19, while the contact points $b, b$ of the same relay switches are respectively connected by way of terminals 33a and 33b to the frequency divider 20.

The system of the above described organization according to this invention operates in the following manner.

First, a valve (not shown) provided in the liquid conduit pipeline 10 at a point upstream from the branch pipelines 11 and 12 is opened so that the liquid flows through the pipeline 10. In the case where, at this time, the flowrate of the liquid flowing through the pipeline 10 is less than the lower limit flowrate value of 50 $m^3/h$ of the flowmeter 18, the movable contacts of the meter relays 25 and 26 both remain connected to their contact points $a, a$, and the relay circuit 27 is in its inoperative state. In the case where the flowrate is less than the upper limit flowrate value of 55 $m^3/h$ of the flowmeter 16 through the flowrate increases, the movable contact of the meter relay 26 is connected to the contact point $b$, but the relay circuit 27 still remains in its inoperative state because the movable contact of the meter relay 25 still remains connected to the contact point $a$.

Accordingly, in the case where the flowrate through the pipeline 10 is less than the upper limit flowrate value of 55 $m^3/h$ of the flowmeter 16, the valve 13 is closed, and the changeover switch 21 (relay switches R2–1, R2–2) is connected to the side of its contact points $a, a$. The liquid therefore flows through the upstream part of the pipeline 10, the branch pipeline 12, the flowmeter 16 the overflow preventing valve 17, the downstream part of the pipeline 10, and the flowmeter 18. The result of measurement by the flowmeter 16 in this case is supplied by way of the frequency divider 19 and the changeover switch 21 to the counter section, where the result undergoes counting operation. In this process, the output pulse signal of the flowmeter 16 is frequency divided in the frequency divider 19 in such a manner that units of flowrate are converted into units of pulse number, whereby the flow quantity is directly indicated in the counter section 22.

Then, when the flowrate through the pipeline 10 increases and exceeds the upper limit flowrate value of 55 $m^3/h$, the movable contact of the meter relay 25 is caused by the output of the D-A converter 23 to move from contact point $a$ to contact point $b$. As a result of this changing over of the meter relay 25, and since the movable contact of the meter relay 26 was already switched to the contact point $b$ when the flowrate exceeded 50 $m^3/h$, the relay R1 is supplied with electric power and is activated. As one result of the operation of the relay R1, the relay switch R1–1 opens, and the three-way valve 14 is so changed over that the control valve 13 is opened. As another result of the operation of the relay R1, the relay switch R1–2 closes, and the relay R2 is supplied with electric power and is activated. Because of this activation of the relay R2, the relay switches R2–1, R2–2 (of changeover switch 21) are switched from their contact points $a, a$ to their contact points $b, b$ and the output of the divider 20 is supplied to the counter section 22. Simultaneously, as a result of the closure of a relay switch R2–3, the relay R2 is self held and continues to be in its operative state.

As the shut-off valve 13 opens, the liquid flowing through the conduit pipeline 10 begins to flow also through the branch pipeline 11 until, when the valve 13 is fully opened, most of the flowrate through the pipeline 10 flows through the branch pipeline 11, since this branch pipeline is for high flowrate as mentioned hereinbefore, and the flowrate through the branch pipeline 12 is reduced lower than 55 $m^3/h$. For this reason, the movable contact of the meter relay 25 is in contact with its contact point $a$. However, since the relay R1 is still in closed-circuit state through the relay switch R1-2 (and relay switch R2-3) and the meter relay 26, there is no change in the operative state of the relay circuit 27. As another result of the opening of the shut-off valve 13, the flowrates of the liquid flowing through the branch pipelines 11 and 12 respectively vary. However, the flowmeter 18 is adapted to measure the flowrate through the pipeline 10, and, simultaneously with opening of the control valve 13, the changeover switch 21 is switched over to the side of the contact points $b$, $b$ thereby to count the result of measurement by the flowmeter 18. For this reason, there is no possibility of erroneous measurement at the time of opening of the control valve 13 and the switching of the results of measurement by the flowmeters 16 and 18. Since the flowrate through the pipeline 10 is greater than 55 $m^3/h$ and is above the lower limit flowrate value of the flowmeter 18, the flowmeter 18 can carry out measurement with fully sufficient accuracy. Thereafter, the counter section 22 indicates the flow quantity by the measured result of the flowmeter 18.

Then, when the flowrate through the pipeline 10 decreases and becomes less than 55 $m^3/h$, there is no change in the operational state as a whole. As the flowrate decreases further and becomes less than 50 $m^3/h$, it is less than the lower limit flowrate value of the flowmeter 18. Consequently, the output of the D-A converter 24 becomes less than a predetermined value, and the movable contact of the meter relay 26 is switched to the contact point $a$, whereupon the relay R1 assumes its open-circuit state wherein the relay switch R1-1 closed and the relay switch R1-2 is opened. The closure of the relay switch R1-1 causes the three-way valve 14 to be actuated to start the closure of the control valve 13.

The switching of the meter relay 26 closes the circuit of a timer T1 by way of the relay switch R2-3 and the meter relay 26. After the set time of the timer T1, which has been previously set for a time period slightly longer than the time required for full closure of the control valve 13 as mentioned hereinbefore, its timer switch T1-1 opens. As a result, the relay R2 is open circuited and becomes inoperative, and the relay switches R2-1 and R2-2 of the changeover switch 21 are switched to their contact points $a$, $a$, while the relay switch R2-3 is opened to release the relay R2 from its self-held state.

The control valve 13 does not close fully immediately after it starts its closing movement but requires a certain time for its full closure. Consequently, if the changeover switch 21 were to be switched simultaneously with the start of the closing action of the valve 13, erroneous measurement would occur. According to the present invention, however, the changeover switch 21 is switched after full closure of the valve 13. For this reason, the counter section 22 carries out counting and indication of the result of measurement of the flowmeter 16 after full closure of the valve 13 with the liquid flowing through the pipeline 10 in a state wherein all of it is flowing through the branch pipeline 12. Therefore, there is no possibility of erroneous measurement.

In the above described embodiment of the system according to the invention, the flow quantity measurement is accomplished by two steps which can be interchanged in accordance with the flowrate. Next, another embodiment of the invention wherein flow quantity measurement is carried out by three changeable steps will now be described with reference to FIGS. 3 and 4.

Figure 3:
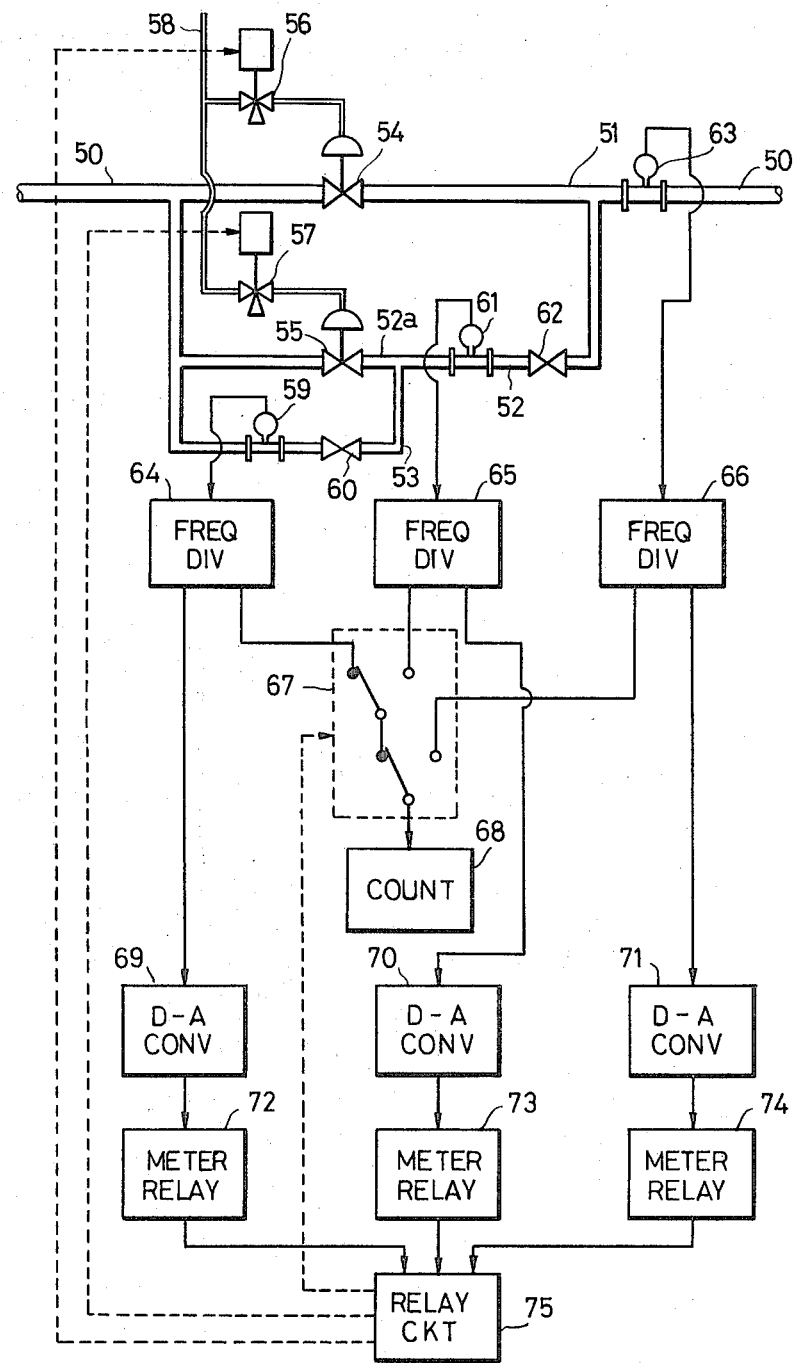
FIG. 3 is a diagram similar to FIG. 1 showing another embodiment of the invention.

At a midway part of a main liquid conduit pipeline 50 as shown in FIG. 3, there are provided in parallel arrangement a branch pipeline 51 for high flowrate and a branch pipeline 52 for medium flowrate, which is further branched at the upstream part thereof into a piping 52a and a branch piping 53 for low flowrate. The branch pipeline 51 for high flowrate is provided therein with a first shut-off control valve 54, and the pipeline 52a is provided therein with a second shut-off control valve 55. These shut-off valves 54 and 55 are actuated by pneumatic pressure supplied thereto from a pneumatic pipeline 58 by way of three-way changeover valves 56 and 57, respectively.

The branch pipeline 53 for low flowrate is provided therein with a flowmeter 59 for measuring low flowrate and an overflow-preventing valve 60. The branch pipeline 52 for medium-flowrate is provided therein with a flowmeter 61 for medium-flowrate measurement and an overflow-preventing valve 62. In addition, a flowmeter 63 for high-flowrate measurement is provided in the liquid conduit pipeline 10 at a point downstream from the branch pipelines 51 and 52.

Flowrate pulse signals from the flowmeters 59, 61, and 63 are respectively supplied to frequency dividers 64, 65, and 66 for reducing the frequencies of these signals to signal frequencies suitable for counting. The output sides of these frequency dividers 64, 65, and 66 are respectively connected, on one hand, with a counter section 68 by way of a changeover switch 67.

Outputs of these frequency dividers 64, 65, and 66 are also supplied to D-A converters 69, 70, and 71. A meter relay 72 transmits a signal to a relay circuit 75 when the output analog signal of the D-A converter 69 reaches a predetermined value, that is, when the flowrate of the liquid flowing through the branch pipeline 53 increases and reaches the upper limit flowrate value, which in the instant embodiment is 55 $m^3/h$, of the flowmeter 59. A meter relay 73 transmits signals to the relay circuit 75 respectively when the output analog signal of the D-A converter 70 increases and reaches a predetermined value, that is, when the flowrate of the liquid flowing through the branch pipeline 52 increases and reaches the upper limit flowrate value, which in this embodiment is 550 $m^3/h$, of the flowmeter 61 and when the output analog signal of the D-A converter 70 decreases and reaches another predetermined value, that is, when the flowrate of the liquid through the branch pipeline 52 decreases and reaches the lower limit flowrate value, which is 50 $m^3/h$ in the instant embodiment. A meter relay 74 transmits a signal to the relay circuit 75 when the output analog signal of the D-A converter 71 decreases and reaches a predetermined value, that is, when the flowrate of the liquid through the pipeline 50 decreases and reaches the lower limit flowrate value of the flowmeter 63, which is 500 $m^3/h$ in the instant embodiment.

The relay circuit 75 operates immediately upon receiving the upper limit signal from the meter relay 72 to switch the changeover switch 67 thereby to introduce the output of the frequency divider 65 into the counter section 68 and, moreover, to send a signal to the three-way valve 57 thereby to cause it to open the shut-off valve 55. Furthermore, the relay circuit 75 operates immediately upon receiving the upper limit signal from the meter relay 73 to switch the changeover switch 67 thereby to introduce the output of the frequency divider 66 into the counter section 68 and, moreover, to send a signal to the three-way valve 56 for causing it to open the control valve 54.

On the other hand, when the relay circuit 75 receives the lower limit signal from the meter relay 74, it immediately sends to the three-way valve 56 a signal for causing it to close the control valve 54 and then, with a specific time delay thereafter (of a time period slightly longer than the time required for full closure of the shut-off valve 54) switches the changeover switch 67 in a manner to introduce the output of the frequency divider 65 into the counter section 68. Furthermore, upon receiving the lower limit signal from the meter relay 73, the relay circuit 75 operates immediately to send to the three-way valve 57 a signal for causing it to close the control valve 55 and then, with a specific time delay thereafter (of a time period slightly longer than the time required for closure of the valve 55) to switch the changeover switch 67 in a manner to introduce the output of the frequency divider 64 into the counter section 68.

One embodiment of a circuit comprising the meter relays 72, 73, and 74, the relay circuit 75, the changeover switch 67, and other components which carry out the above described operations is illustrated in FIG. 4. This circuit is substantially equivalent to a combination of two circuits each as shown in FIG. 2. The movable contacts 72a, 73a, 73b, and 74a of the meter relays 72, 73, and 74 are controlled in their switching actions by the outputs of the D-A converters 69, 70, and 71, respectively. Normally closed relay switches R1–1 and R3–1, which are respectively opened when relays R1 and R3 operate, are respectively connected between terminals 76a and 76b connected to the three-way valve 57 and between terminals 77a and 77b connected to the three-way valve 56. A common terminal 78 of the changeover switch 67 is connected to the counter section 68. Furthermore, terminals 79, 80, and 81 respectively connected to contact points a and b of a relay switch R2–1 of the relay R2 and to a contact point b of a relay switch R4–1 of a relay R4 are connected respectively to the frequency dividers 64, 65, and 66.

The system of the above described organization operates in the following manner.

In the case where the flowrate of the liquid flowing through the liquid conduit pipeline 50 is less than the lower limit flowrate value of 50 $m^3/h$ of the flowmeter 61, the movable contacts 72a, 73a, 73b, and 74a of the meter relays 72, 73, and 74 all remain connected to their respective contact points a, a, while the relay circuit 75 is in its inoperative state. Furthermore, in the case where the liquid flowrate increases but is less than the upper limit flowrate value of 55 $m^3/h$ of the flowmeter 59, the movable contact 73a of the meter relay 73 is in contact with its contact point b, but the movable contact 72a of the meter relay 72 remains in contact with its contact point a. For this reason, the relay circuit 75 still remains in its inoperative state. Accordingly, in the case where the flowrate through the liquid conduit pipeline 50 is less than the upper limit flowrate value of 55 $m^3/h$ of the flow-meter 59, the control valves 54 and 55 are closed, and, furthermore, the movable contacts of the relay switches R2–1 and R4–1 of the changeover switch 67 are both in contact with their respective contact points a. The liquid flows through the upstream part of the pipeline 50, the branch pipeline 53, the flowmeter 59, the overflow-preventing valve 60, the downstream part of the pipeline 50, and the flowmeter 63. In this case, the result of measurement by the flowmeter 59 is supplied by way of the frequency divider 64 and the changeover switch 67 to the counter section 68, where it is subjected to counting operation, and the flowrate is indicated.

Then, when the flowrate of the liquid flowing through the pipeline 50 increases and exceeds the upper limit flowrate value of 55 $m^3/h$ of the flowmeter 59, the movable contact 72a of the meter relay 72 is switched from the contact point a to the contact point b by the output of the D-A converter 69. Because of this switching of the meter relay 72, the movable contact 73a of the meter relay 73 was already switched to the contact point b when the flowrate exceeded 50 $m^3/h$, whereby the relays R1 and R2 are simultaneously supplied with electric power and operate. The operation of the relay R1 causes the relay switch R1–1 to open, and the three-way valve 57 is so switched as to cause the shut-off valve 55 to open. Furthermore, the operation of the relay R2 causes the movable contact of the relay switch R2–1 to be switched to its contact point b, and the output of the frequency divider 65 is supplied by way of terminals 80 and 78 to the counter section 68. Simultaneously, the operations of the relays R1 and R2 cause the relay switches R1–2 and R2–2 to close, and the relays R1 and R2 are self held in their powered states.

As a result of the opening of the shut-off valve 55, the liquid which has been sent through the pipeline 50 flows into the branch pipeline 52. After the valve 55 is fully opened, the greater part of the liquid flowing through the pipeline 50 flows through the branch pipeline 52, and the flowrate through the branch pipeline 53 decreases until it becomes less than 55 $m^3/h$. Consequently, the movable contact 72a of the meter relay 72 is switched to its contact point a. However, since the relays R2 and R1 remain in closed circuit states respectively through the relay switch R2–2 (and relay switch R1–2) and through, in addition, the movable contact 73a of the meter relay 73, there is no change in the operational state of the relay circuit 75. As another result of the opening of the shut-off valve 55, the flowrates of the liquid flowing through the branch pipelines 52 and 53 respectively change. However, the flowmeter 61 measures the flowrate of the liquid flowing through the pipeline 52 as a result of the merging of the flows through the branch pipelines 52 and 53, and, furthermore, simultaneously with the opening of the valve 55, the changeover switch 67 is switched thereby to count the result of measurement by the flowmeter 61. Therefore, erroneous measurement does not occur when the control valve 55 opens, and the results of measurement by the flowmeters 59 and 61 are switched. In this case, the flowrate through the pipeline 52 is exceeding 55 $m^3/h$ and is higher than the lower limit flowrate value of 50 $m^3/h$ of the flowmeter 61. Therefore, the flowmeter 61 is capable of carrying out measurements with sufficient accuracy.

Then, when the flowrate through the liquid conduit pipeline 50 increases and exceeds the lower limit flowrate value of 500 $m^3/h$ of the flowmeter 63, the movable contact 74a of the meter relay 74 is switched to its contact point b. However, since the movable contact 73b of the meter relay 73 remains in contact with its contact point a, there is no change in the operation state of the relay circuit 75. Then, when the flowrate through the pipeline 50 increases further and exceeds the upper limit flowrate of 550 $m^3/h$ of the flowmeter 61, the movable contact 73b of the meter relay 73 is switched over to its contact point b by the output of the D-A converter 70. Since the movable contact 74a of the meter relay 74 is already in contact with the contact point b at this time, the relays R3 and R4 are simultaneously supplied with electric power by the switching of the meter relay contact 73b to its contact point b and are thereby activated.

The relay R3 thus operates to open the relay switch R3-1, and the three-way valve 56 is thereby actuated to cause the control valve 54 to open. The relay R4 operates to switch the movable contact of the relay switch R4-1 to its contact point b, and the output of the frequency divider 66 is supplied through terminals 81 and 78 to the counter section 68. Simultaneously, the relay switches R3-2 and R4-2 are closed by the operations of the relays R3 and R4, which are thus self held in their power-supplied states. The operation of the relay R4 further causes the normally opened relay switch R4-3 to close and the normally closed relay switch R4-4 to open.

As a result of the opening of the shut-off valve 54, the liquid supplied through the upstream part of the liquid conduit pipeline 50 flows through the branch pipeline 51. After the valve 54 is fully opened, most of the liquid flowing through the pipeline 50 flows through the branch pipeline 51, the flowrate through the pipeline 52 thereby decreasing, and the meter relay movable contacts 73a and 73b are switched to their respective contact points a. However, although the movable contact 73a is switched to its contact point a, the relay switch R1-1 closes since the relay R1 is being supplied with power through the already closed relay switch R4-3, and the control valve 55 remains open. Furthermore, although the movable contact 73a is switched to its contact point a, the timer T1 does not operate since the relay switch R4-4 is already open. Moreover, although the relay movable contact 73b is switched to its contact point a, the relays R3 and R4 are maintained in their power-supplied states through the relay switches R3-2 and R4-2 and the relay movable contact 74a.

The operation of the system in the case where the flowrate of the liquid flowing through the pipeline 50 decreases is as follows.

As this flowrate through the pipeline 50 progressively decreases and becomes less than 500 $m^3/h$, it becomes less than the lower limit flowrate of the flowmeter 63. Consequently, the output of the D-A converter 71 becomes less than a predetermined value, whereby the meter relay contact 74a is switched to its contact point a. As a result, the relay R3 is open circuited, the relay switch R3-1 is closed, and the relay switch R3-2 is opened. The closure of the relay switch R3-1 activates the three-way valve 56, which thereby begins to close the control valve 54.

The switching the meter relay contact 74a to its contact point a closes the circuit of the timer T2 through the relay switch R4-2 and the meter relay contact 74a. Accordingly, after the set time (which is slightly longer than the time required for full closure of the control valve 54) of this timer T2, its timer switch T2-1 opens. Consequently, the relay R4 is open circuited and becomes inoperative. The relay switch R4-1 is switched to its contact point a, and the output of the frequency divider 65 is supplied to the counter section 68. Furthermore, the relay switches R4-2 and R4-3 are opened, while the relay switch R4-4 is closed.

At this time, the control valve 54 is already fully opened, and all of the liquid flowing through the pipeline 50 is flowing through the pipeline 52. Accordingly, the meter relay contact 73a is in contact with its contact point b, and the relay R1 is being supplied with power and continues to maintain its operative state. The relay R2 also continues its self held state and remains operative.

When the flowrate of the liquid through the pipeline 50 decreases and becomes less than 50 $m^3/h$, the meter relay contact 73a is switched to its contact point a. As a result, the relay R1 is open circuited, the relay switch R1-1 closes, and the relay switch R1-2 opens. When the relay switch R1-1 thus closes, the three-way valve 57 is changed, whereby the control valve 55 starts to close.

The switching of the meter relay contact 73a closes the circuit of the timer T1 through the relay switch R2-2 and this contact 73a. Consequently, after the set time (which is slightly longer than the time required for full closure of the control valve 55) of the timer T1, the timer switch T1-1 opens. As a result, the relay R2 is open circuited and becomes inoperative, and the relay switch R2-1 is switched to its contact point a, whereby the output of the frequency divider 64 is supplied to the counter section 68. Furthermore, the relay switch R2-2 opens, whereby the relay R2 is released from its self held state.

The present invention as described above with respect to two preferred embodiments thereof is particularly effective and advantageous in applications to systems wherein there are no direct-reading integrating parts, and flowmeters such as throttling flowmeters, eddy flowmeters, electromagnetic flowmeters, and turbine meters are used.

Further, this invention is not limited to these embodiments but various variations and modifications may be made without departing from the scope and spirit of the invention.

What I claim is:

1. A flow quantity measuring system comprising:
   a liquid conduit pipeline for flow therethrough of a liquid to be measured;
   a branch pipeline for small flowrate branched from said liquid conduit pipeline and not provided with a shut-off valve;
   a single shut-off valve in said liquid conduit pipeline, said branch pipeline bypassing said shut-off valve;
   a flowmeter for small flowrate provided in said branch pipeline for measuring flowrate therein smaller than a certain upper flowrate limit within which measurement is possible with a specific precision;

a second flowmeter for large flowrate provided in said liquid conduit pipeline for measuring flowrate therein larger than a certain lower flowrate limit within which measurement is possible with a specific precision;

a counter section for counting the results of measurement of said flowmeters;

changeover switching means for selectively switching the results of measurement of said flowmeters and supplying the same to said counter section; and control means for operating in accordance with said results of measurement of the flowmeters to cause switching of said changeover switching means and to control the opening and closing of said shut-off valve, said control means thus operating to carry out:

in the case where the flowrate of the liquid through the liquid conduit pipeline increases progressively and exceeds the upper flowrate limit value of said first flowmeter for small flowrates, switching of said changeover switching means thereby to cause said shut-off valve provided in said liquid conduit pipeline to open and, at the same time, to cause the result of measurement by said second flowmeter for large flowrates provided in said liquid conduit pipeline to be supplied to said counter section; and in the case where the flowrate of the liquid through the liquid conduit pipeline decreases progressively and becomes less than the lower flowrate limit value of said second flowmeter for large flowrate, switching of said changeover switching means thereby to cause said shut-off valve to close and, moreover, to cause the result of measurement by said first flowmeter for small flowrate to be supplied to said counter section after a predetermined time from the start of this closing of the shut-off valve.

2. A flow quantity measuring system as claimed in claim 1 in which the upper flowrate limit value of said flowmeter for small flowrate is selected to be greater by a specific value than the lower flowrate limit value of said flowmeter for large flowrate, and said flowmeter for small flowrate operates to measure continually flowrate less than said lower flowrate limit value and, moreover, to measure also flowrate up to said upper flowrate limit only in the case where the flowrate of the liquid flowing through said liquid conduit pipeline increases, the result of this measurement being counted.

3. A flow quantity measuring system as claimed in claim 1 in which said predetermined time is selected to be of a value ranging from the closure time required from the start of closure of said shut-off valve to full closure to a value slightly greater than said closure time.

4. A flow quantity measuring system comprising:

a liquid conduit pipeline for flow therethrough of a liquid to be measured;

a branch pipeline for small flowrate branched from said liquid conduit pipeline and not provided with a shut-off valve;

a first branch pipeline for large flowrate branched from said conduit pipeline and passing therethrough the liquid with a flowrate substantially greater than the flowrate of the liquid flowing said branch pipeline for small flowrate;

a second branch pipeline for large flowrate branched from said conduit pipeline and passing therethrough the liquid with a flowrate substantially greater than the flowrate of the liquid flowing through said first branch pipeline for large flowrate;

first and second shut-off valves provided respectively in said first and second branch pipelines for large flowrate;

a small-flowrate flowmeter provided in said branch pipeline for small flowrate for measuring flowrate therein to a certain upper flowrate limit within which measurement is possible with a specific precision;

a first large-flowrate flowmeter provided in said first branch pipeline for large flowrate for measuring flowrate therein between a certain upper flowrate limit value and a certain lower flowrate limit value within which measurement is possible with a specific precision;

a second large-flowrate flowmeter provided in said second branch pipeline for large flowrate for measuring flowrate therein to a certain lower flowrate limit within which measurement is possible with a specific precision;

a counter section for counting the results of measurement of said flowmeters;

changeover switching means for selectively switching the results of measurement of said flowmeters and supplying the same to said counter section; and control means for operating in accordance with said results of measurement of the flowmeters to cause switching of said changeover switching means and to control the opening and closing of said shut-off valves, said control means thus operating to carry out: in the case where the flowrate of the liquid through the conduit pipeline increases progressively and exceeds the upper flowrate limit value of said small-flowrate flowmeter, switching of said changeover switching means thereby to cause said first shut-off valve to open and, at the same time, to cause the result of measurement of said first large-flowrate flowmeter to be supplied to said counter section; in the case where the flowrate of the liquid through the conduit pipeline increases progressively and exceeds the upper flowrate limit value of said first large-flowrate flowmeter, switching of said changeover switching means thereby to cause said second shut-off valve to open and, at the same time, to cause the result of measurement of said second large-flowrate flowmeter to be supplied to the counter section;

in the case where the flowrate of the liquid through the conduit pipeline decreases progressively and becomes less than the lower flowrate limit value of said second large-flowrate flowmeter, switching said changeover switching means thereby to cause said second shut-off valve to close and, moreover, to cause the result of measurement of said first large-flowrate flowmeter to be supplied to the counter section after a predetermined time from the start of this valve closure; and in the case where the flowrate of the liquid through the conduit pipeline decreases progressively and becomes less than the lower flowrate limit value of said first large-flowrate flowmeter, switching of said changeover switching means thereby to cause said first shut-off valve to close and, moreover, to cause the result of measurement of said small-flowrate flowmeter to be supplied to the counter section after a predetermined time from the start of this closure of the first shut-off valve.

5. A flow quantity measuring system as claimed in claim 4 in which the upper flowrate limit value of said small-flowrate flowmeter is selected to be greater by a first predetermined flowrate value than the lower flowrate limit value of said first large-flowrate flowmeter, and the upper flowrate limit value of the first large-flowrate flowmeter is selected to be greater by a second predetermined flowrate value than the lower flowrate limit value of said second large-flowrate flowmeter.

6. A flow quantity measuring system comprising:
a liquid conduit pipeline for flow therethrough of a liquid to be measured;
a first branch pipeline for small flowrate branched from said liquid conduit pipeline and not provided with a shut-off valve;
a second branch pipeline for large flowrate branched from the liquid conduit pipeline for flow therethrough of the liquid with a flowrate substantially greater than the flowrate of the liquid flowing through said first branch pipeline;
a single shut-off valve provided in said second branch pipeline for large flowrate;
a first flowmeter for small flowrate provided in said first branch pipeline for measuring flowrate therein smaller than a certain upper flowrate limit within which measurement is possible with a specific precision;
a second flowmeter for large flowrate provided in said liquid conduit pipeline for large flowrate for measuring flowrate therein larger than a certain lower flowrate limit within which measurement is possible with a specific precision;
a counter section for counting the results of measurement of said flowmeters;
changeover switching means for selectively switching the results of measurement of said flowmeters and supplying the same to said counter section; and
control means for operating in accordance with said results of measurement of the flowmeters to cause switching of said changeover switching means and to control the opening and closing of said shut-off valve, said control means comprising D-A converters for small and large flowrates to convert digital quantities of the results of measurement respectively by said flowmeters for small and large flowrates into analog quantities, a meter relay for small flowrate adapted to be switched when the output of said D-A converter for small flowrate becomes greater than a predetermined value corresponding to said upper flowrate limit value, a meter relay for large flowrate adapted to be switched when the output of said D-A converter for large flowrate becomes less than a predetermined value corresponding to said lower flowrate limit value, and a relay circuit operating in accordance with the switching of said meter relays to control the switching of said changeover switching means and the opening and closing of said shut-off valve,
said control means thus operating to carry out: in the case where the flowrate of the liquid through the liquid conduit pipeline increases progressively and exceeds the upper flowrate limit value of said first flowmeter for small flowrates, switching of said changeover switching means thereby to cause said shut-off valve provided in said second branch pipeline for large flowrate to open and, at the same time, to cause the result of measurement by said second flowmeter for large flowrate provided in said liquid conduit pipeline to be supplied to said counter section; and in the case where the flowrate of the liquid through the liquid conduit pipeline decreases progressively and becomes less than the lower flowrate limit value of said second flowmeter for large flowrate, switching of said changeover switching means thereby to cause said shut-off valve to close and, moreover, to cause the result of measurement by said flowmeter for small flowrate to be supplied to said counter section after a predetermined time from the start of this closing of the shut-off valve.

7. A flow quantity measuring system as claimed in claim 6 in which the upper flowrate limit value of said flowmeter for small flowrate is selected to be greater by a specific value than the lower flowrate limit value of said flowmeter for large flowrate, and said flowmeter for small flowrate operates to measure continually flowrate less than said lower flowrate limit value and, moreover, to measure also flowrate up to said upper flowrate limit only in the case where the flowrate of the liquid flowing through said liquid conduit pipeline increases, the result of this measurement being counted.

8. A flow quantity measuring system as claimed in claim 6 in which said predetermined time is selected to be of a value ranging from the closure time required from the start of closure of said shut-off valve to full closure to a value slightly greater than said closure time.

* * * * *